US012790170B2

(12) United States Patent
Finschi et al.

(10) Patent No.: US 12,790,170 B2
(45) Date of Patent: Nov. 10, 2026

(54) BUILDING SYSTEM FOR A BUILDING HAVING WAITING ZONES FOR THE USE OF AN ELEVATOR SYSTEM

(71) Applicant: Inventio AG, Hergiswil (CH)

(72) Inventors: Lucas Finschi, Ebikon (CH); Christian Studer, Kriens (CH)

(73) Assignee: INVENTIO AG, Hergiswil (CH)

( * ) Notice: Subject to any disclaimer, the term of this patent is extended or adjusted under 35 U.S.C. 154(b) by 797 days.

(21) Appl. No.: 18/251,719

(22) PCT Filed: Nov. 3, 2021

(86) PCT No.: PCT/EP2021/080491
§ 371 (c)(1),
(2) Date: May 4, 2023

(87) PCT Pub. No.: WO2022/101069
PCT Pub. Date: May 19, 2022

(65) Prior Publication Data
US 2024/0017962 A1 Jan. 18, 2024

(30) Foreign Application Priority Data
Nov. 12, 2020 (EP) .................................... 20207208

(51) Int. Cl.
*B66B 1/34* (2006.01)
*B66B 1/46* (2006.01)
(Continued)

(52) U.S. Cl.
CPC .............. *B66B 3/006* (2013.01); *B66B 1/468* (2013.01); *G06K 7/10366* (2013.01);
(Continued)

(58) Field of Classification Search
CPC ........... B66B 3/006; B66B 1/468; G07C 9/29; G06K 7/10366
(Continued)

(56) References Cited

U.S. PATENT DOCUMENTS 4,727,499 A * 2/1988 Tsuji .................... B66B 1/2408 702/182
10,185,921 B1 1/2019 Heller et al.
(Continued)

FOREIGN PATENT DOCUMENTS

CN 107758460 A 3/2018
CN 111908281 A 11/2020
(Continued)

*Primary Examiner* — Erick D Glass
(74) *Attorney, Agent, or Firm* — Shumaker, Loop & Kendrick, LLP

(57) ABSTRACT

A building system includes an elevator system installed in a building. First and second waiting zones for users of the elevator system are specified, wherein the second waiting zone is located in an access region to an elevator of the elevator system. The building system further includes a call input apparatus that receives an elevator call from a user located in the first waiting zone or in a fixed environment of the first waiting zone, and a control apparatus that is communicatively connected to the call input apparatus. In response to a call input from the first waiting zone, the control apparatus can either request the user to wait there until they are called to go into the second waiting zone or can request them to immediately enter the second waiting zone. An allocated elevator can be communicated to the user in the first or second waiting zone.

15 Claims, 2 Drawing Sheets

4 ELEVATOR
6 MOBILE ELECTRONIC COMMUNICATION DEVICE
12 COMMUNICATION DEVICE
14 CALL INPUT APPARATUS
16 CONTROL APPARATUS

(51) Int. Cl.

| | |
|---|---|
| ***B66B 3/00*** | (2006.01) |
| ***G06K 7/10*** | (2006.01) |
| ***G06K 7/14*** | (2006.01) |
| ***G07C 9/29*** | (2020.01) |

(52) U.S. Cl.

CPC ............. *G06K 7/1417* (2013.01); *G07C 9/29* (2020.01); *B66B 2201/463* (2013.01); *B66B 2201/4638* (2013.01); *B66B 2201/4653* (2013.01); *B66B 2201/4684* (2013.01)

(58) Field of Classification Search

USPC .......................................................... 187/247

See application file for complete search history.

(56) References Cited

U.S. PATENT DOCUMENTS

| | | | | |
|---|---|---|---|---|
| 10,766,737 | B2 * | 9/2020 | Salmikuukka | B66B 1/468 |
| 11,597,628 | B2 * | 3/2023 | Jia | B66B 1/2458 |
| 11,643,299 | B2 * | 5/2023 | Huang | B66B 1/2408 187/247 |
| 2016/0152439 | A1 * | 6/2016 | MacDonald | B66B 9/00 187/380 |
| 2017/0098337 | A1 | 4/2017 | Galley et al. | |

FOREIGN PATENT DOCUMENTS

| | | | |
|---|---|---|---|
| WO | 2019121335 | A1 | 6/2019 |
| WO | 2019121336 | A1 | 6/2019 |
| WO | 2019147992 | A1 | 9/2019 |

* cited by examiner

4 ELEVATOR
6 MOBILE ELECTRONIC COMMUNICATION DEVICE
12 COMMUNICATION DEVICE
14 CALL INPUT APPARATUS
16 CONTROL APPARATUS

BUILDING SYSTEM FOR A BUILDING HAVING WAITING ZONES FOR THE USE OF AN ELEVATOR SYSTEM

FIELD

The technology described herein relates generally to a building system that performs one or more services in a building. In particular, exemplary embodiments of the technology relate to a building system comprising an elevator system, and to a method for operating such a building system.

BACKGROUND

Building systems can be configured in various ways for a wide variety of applications. In a building, the building system may comprise an access control system that controls, for example, access to a restricted-access zone (e.g., building entrance or landings with access to elevators). In such an access control system, users who want to use the service of the access control system can identify themselves as authorized in different ways, for example with a key, a magnetic card, chip card, or RFID card, or a mobile electronic device (for example, cell phone).

The building system can additionally or alternatively comprise an elevator system installed in the building. In order to use the service of the elevator system, a user can for example, input an elevator call at a floor call terminal in order to be transported from a boarding floor to a destination floor. Depending on the type and purpose of a building, the elevator system and the access control system can be configured in such a way that an elevator call is initiated when the user is granted access; the elevator call can be made to a specified destination floor that is stored in a user profile created for the user.

In addition, a relatively high number of users can request the services of the building system at substantially the same time. The building system, i.e., in particular the elevator system and/or the access control system, is configured to provide the services efficiently in order to keep waiting times and clusters of users (potentially jostling crowds) to a minimum. Nevertheless, clusters of users can occur. Such clusters in the building can make users feel uncomfortable and, if there is a user with an infectious disease amongst them, it can support the propagation of viruses and bacteria. There is, therefore, a need for a building system which avoids these disadvantages as far as possible in order to increase usability.

SUMMARY

One aspect of such a technology relates to a building system for a building in which an elevator system is installed and is encompassed by the building system. At least a first waiting zone and a second waiting zone that is accessible from the first waiting zone to users of the elevator system are specified for the building. The second waiting zone is located in an access region to an elevator of the elevator system. The building system comprises a call input apparatus, which is configured to receive an elevator call from a user located in the first waiting zone or in a specified environment of the first waiting zone. The building system also comprises a control apparatus which is communicatively connected to the call input apparatus. The control apparatus is configured to register an elevator call from the user, which is received by the call input apparatus, and to generate a first notification to inform the user, wherein the first notification prompts the user to enter the second waiting zone from the first waiting zone. The control apparatus is also configured to determine an elevator, which serves the registered elevator call, and to cause the determined elevator to move.

Another aspect relates to a method for operating a building system for a building in which an elevator system is installed and is encompassed by the building system. At least a first waiting zone and a second waiting zone that is accessible from the first waiting zone to passengers of the elevator system are specified for the building. The second waiting zone is located in an access region to an elevator of the elevator system. The method comprises receiving an elevator call from a user, which was input by means of a call input apparatus located in the first waiting zone or in a specified environment of the first waiting zone, by a control apparatus, which is communicatively connected to the call input apparatus. The method also comprises the control apparatus generating a first notification to inform the user, wherein the first notification prompts the user to enter the second waiting zone from the first waiting zone. The method also comprises determining an elevator by means of the control apparatus, which elevator serves the registered elevator call, and causing the determined elevator to move by means of the control apparatus.

The technology described here makes it possible to separate the users by means of a multi-stage waiting zone and to guide them in a controlled manner to the elevator system. As a result, the risk of the clusters of people or jostling crowds and the associated risk of spreading bacteria and viruses can be reduced.

In addition, it can be expected that ease of use is improved when using the building system, in particular its elevator system. By way of example, waiting for an elevator in the access zone is more pleasant because fewer users loiter there and thus jostling is avoided upon entering. Furthermore, fewer users enter an elevator car as a result, potentially only a single user. The users can thus also keep a greater distance from one another in the elevator car. The building system can support ease of use in that the users are informed by means of a notification about the procedure in connection with the waiting zones and the reasons for this.

At least two waiting zones, which can be specified according to the building, are specified for the building. In one exemplary embodiment, two waiting zones are specified in the building, wherein one of the waiting zones is located in the access region of the elevators. The access region is the region on a floor from which the users enter or exit an elevator car. The second waiting zone is accessible from the first waiting zone; this means, for example, that a user should first go to the first waiting zone before they can enter the second waiting zone. The first waiting zone can also be located outside the building; that means that a user only enters the building and thus the second waiting zone when they are requested to do so after a call input by means of the call input apparatus, which is carried out outside the building. Depending on the building, more than two waiting zones can also be specified.

In response to an elevator call input from the first waiting zone or its surroundings, the control apparatus can generate a notification for the user. The user can be informed, for example, to go from the first waiting zone into the second waiting zone (first notification). In one exemplary embodiment, the first notification may comprise information about the determined elevator. The user can, for example, be requested to wait in the first waiting zone until they are notified to go into the second waiting zone (second notification). The control apparatus generates the second notification before the first notification.

In the present description, the terms “first notification” and “second notification” are used to distinguish the notifications and their information content from one another. Unless otherwise specified, these notifications do not express a sequence.

The first notification can be generated, for example, immediately after the call input. In such a situation, the user can go into the second waiting zone without having to wait in the first waiting zone. In another situation, the second notification may inform the user to first wait in the first waiting zone; the first notification then informs the user that they can enter the second waiting zone from the first waiting zone. In one exemplary embodiment, the first notification may comprise information about the allocated elevator. The user thus knows at an early stage which elevator is allocated to the call. The person skilled in the art recognizes that the allocated elevator can be communicated to the user in the first or second waiting zone.

In order to communicate the allocated elevator to a user, in particular in the second waiting zone or on the way there, in one embodiment the building system comprises a communication device, which is arranged in the second waiting zone or in an entry to the second waiting zone and is communicatively connected to the control apparatus. The control apparatus is configured to control the communication device in order to communicate the allocated elevator to the user.

The technology described herein can be adapted to the requirements of the building. Accordingly, the call input apparatus can be configured to be adapted to the building. The call input apparatus can comprise a radio device for receiving an elevator call input by means of a mobile communication device (e.g., cell phone) of a user, a reading device for reading an electronic or optical code and/or an input device for manual input of an elevator call. An electronic code can be stored on an RFID card, for example, and an optical code can be printed on a carrier material or displayed on a display of a cellular phone, for example. For this purpose, the reading device can have an RFID card reader and/or an optical scanner. The input device for manual input can have a keyboard which comprises electromechanical keys or is represented by a touch-sensitive screen.

In one exemplary embodiment, the radio device is configured to transmit a notification to the mobile communication device of the user by means of which the user inputs the elevator call. Since the call is in particular input by means of the user’s mobile communication device, it is not necessary for the user to touch a call device installed in the building.

In one exemplary embodiment, by means of the mobile communication device, the user receives, for example, the request to wait in the first waiting zone until notified to go into the second waiting zone (second notification). In another situation, the notification can inform the user to enter the second waiting zone (first notification); in one exemplary embodiment, this notification can also comprise information about the determined or allocated elevator. In one exemplary embodiment, the transmission option can be provided by means of the mobile communication device in addition to the communication device mentioned in the second waiting zone.

In one exemplary embodiment, ease of use can be improved in that a ticket is allocated to each call input. The control apparatus is therefore configured to allocate a ticket to the input elevator call and to cause the ticket to be transmitted to the user, wherein the control apparatus in particular controls the call input device for ticket transmission. In the application of the multi-stage waiting zone system described here, it can thereby be prevented that users fail to adhere to the waiting system and move in the direction of the elevator, although it is not yet their turn.

The ticket design can differ depending on the building. The call input apparatus can be configured as follows: The ticket can be printed out, for example as a number or alphanumeric character string on a paper medium; in one embodiment, it can be displayed, for example, as an optical code (QR or bar code), so that it can be detected by a camera of a cell phone, or the ticket can be transmitted (announced) as a voice message. In one exemplary embodiment, the ticket can be transmitted as a radio signal which is received in radio range by the cell phone of the user.

In one exemplary embodiment, the building system comprises an access control system which comprises an access gate. The access gate is communicatively connected to the control apparatus and is provided at a transition between the first waiting zone and the second waiting zone. The access gate is configured to unblock or block the transition. The access gate has a device for detecting a ticket allocated to the received elevator call by the control apparatus. The control apparatus is configured to control the access gate in such a way that the transition is unblocked when the detected ticket corresponds to the ticket assigned to the elevator call.

DESCRIPTION OF THE DRAWINGS

Various aspects of the improved technology are described in greater detail below with reference to exemplary embodiments in conjunction with the drawings. In the figures, identical elements have identical reference signs. In the figures.

DETAILED DESCRIPTION

Figure 1:
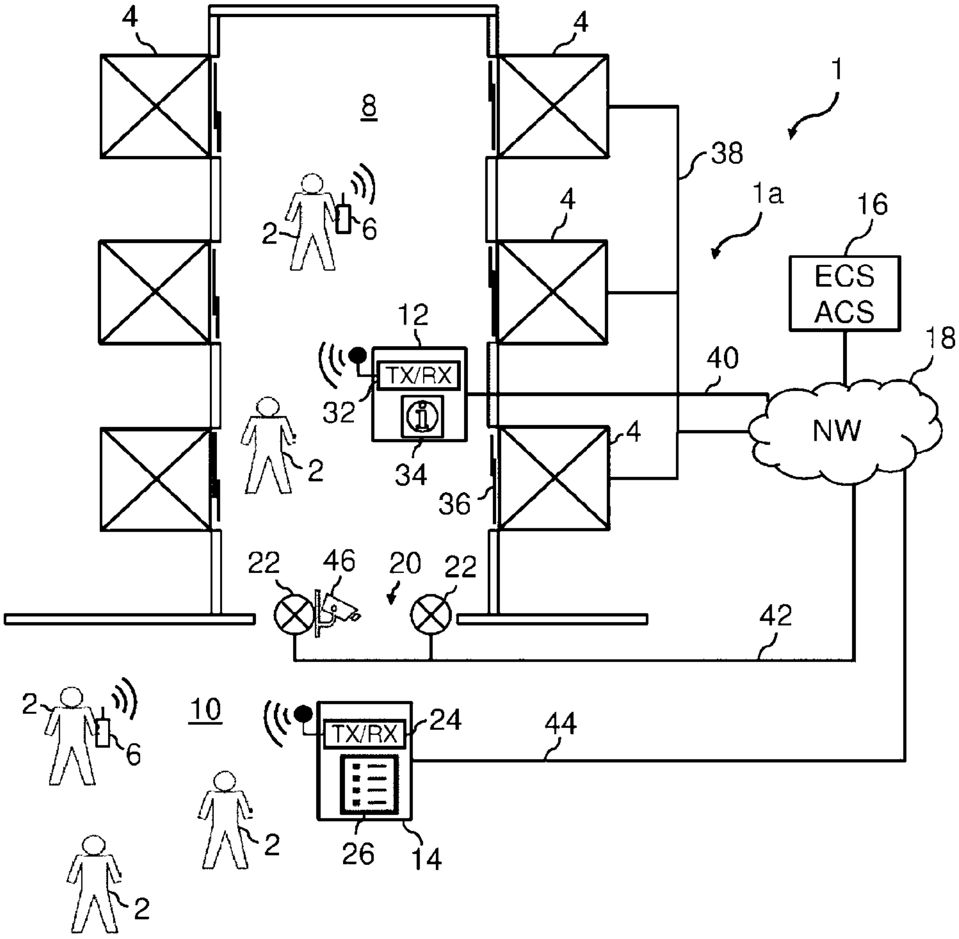
FIG. 1 shows a schematic representation of an application example of a building system in a building that has two waiting areas.

FIG. 1 is a schematic representation of an application example of a building system 1 in conjunction with an example of a situation in a building; for illustration purposes, only a few walls, waiting zones 8, 10 and elevators 4 of an elevator system 1*a* are shown. Instead of the four elevators 4 shown, the elevator system 1*a* can have a larger or smaller number of elevators 4. In the situation shown in FIG. 1, multiple users 2 are each located in one of the (first) waiting zone 10 and the (second) waiting zone 8. The waiting zone 8 is accessible from the first waiting zone 10 and is located in an access region to the elevators 4; in the access region, users 2 move, for example, from and to the elevators 4. Some of the users 2 shown each carry a mobile electronic communication device 6 (hereinafter also referred to as cell phone 6), while other users 2 are shown without such a device.

The waiting zones 8, 10 can, as shown in FIG. 1, be arranged separately from one another. In order to reach the waiting zone 10 from the waiting zone 8, a user 2 has covered a specified distance for which the user 2 requires a certain walking time. In one exemplary embodiment, the time (walking time) that an average user 2 needs to cover the specified distance can be specified.

In the exemplary embodiment shown, a communication device 12 is arranged in the second waiting zone 8, which communication device is communicatively connected via a line 40 to a communication network 18 (NW) and via the latter to a control apparatus 16 of the building system 1. The person skilled in the art recognizes that, in another exemplary embodiment, the communication device 12 can be omitted, for example when communication with a user 2 is effected by means of a cell phone 6. The person skilled in the art also recognizes that in another exemplary embodiment the communication device 12 can be arranged at a different location, for example in the region of a transition from the first waiting zone 8 to the second waiting zone 10.

A call input apparatus 14 arranged, for example, in the waiting zone 10 is also communicatively connected via a line 44 to the communication network 18 and the control apparatus 16. The person skilled in the art recognizes that the call input apparatus 14 is generally configured and arranged such that it can receive an elevator call of a user 2 located in the first waiting zone 10 or in a fixed environment of the first waiting zone 10. The first waiting zone 10 can also be located outside the building.

FIG. 1 also shows that the control apparatus 16 is communicatively connected to the elevators 4 via the communication network 18 and a line network 38. The control apparatus 16 comprises an elevator control system (ECS), which is configured, for example, as a group controller and allocates an elevator 4 serving the call to an elevator call input at the call input apparatus 14.

The communication device 12 shown in FIG. 1 is used for communication with the users 2 located in the region or in the transition to the waiting zone 8. The communication device 12 informs the users 2, for example, whether and when which elevator 4 is ready or will be ready to enter. For this information task, the communication device 12 can be configured for the requirements established in the building. The communication device 12 can comprise a screen device 34 which, for example, visibly displays the entry information for the user 2; if necessary, the entry information can also be output as a voice message. In one exemplary embodiment, the communication device 12 comprises a radio device 32 (TX/RX) which is configured for radio communication with a cell phone 6. The person skilled in the art recognizes that the communication device 12 can have one or more of the aforementioned devices (screen device 34, radio device 32). The person skilled in the art also recognizes that these devices are arranged separately from one another in the waiting zone 8 or in the region of the waiting zone 8 and can accordingly be communicatively connected to the control apparatus 16.

A user 2 can input an elevator call by means of the call input apparatus 14. The call input apparatus 14 can be configured in various ways. In the following, various exemplary embodiments are specified in which the call input apparatus has one or more devices for this purpose. The person skilled in the art also recognizes that the devices mentioned can be arranged separately from one another in or in the area surrounding the waiting zone 10.

The call input apparatus may comprise, for example, a keyboard 26 on which the user 2 can enter a desired direction of travel or a desired destination floor. The keyboard 26 may comprise electromechanical keys or be displayed on a touch-sensitive screen. In one exemplary embodiment, the call input apparatus 14 may comprise an optical reading device in order to detect, for example, an optical code (for example a QR code, a bar code or a color code) from an information carrier (e.g., credit card-type credentials or screen of a cell phone 6). Additionally or alternatively, a radio-based reading device may be present, which reads information from an RFID transponder, for example. In addition to these possibilities for call input, a call may also be input by means of voice input. The call input apparatus 14 can confirm an input elevator call and a potentially allocated elevator 4 to the user 2 by means of an optical display and/or a voice message, for which a screen device and/or an audio device may be present. In one exemplary embodiment, the call input apparatus 14 may comprise a radio device 24 (TX/RX) in order to facilitate a call input by means of a cell phone 6. A confirmation and/or the elevator allocation then takes place by means of the cell phone 6.

In the situation shown in FIG. 1, the technology described herein can be used in an advantageous manner. Summarizing briefly and by way of example, a building system 1 is created by the technology described here, in which building system 1 the user 2 is guided to the elevator system individually and in a controlled manner. As a result, the risk of the clusters of people or jostling crowds and the associated risk of spreading bacteria and viruses can be reduced. If, for example, a user 2 enters the building and would like to use an elevator 4, they can be informed that they should first enter waiting zone 10 to input an elevator call. The control apparatus 16 receives the elevator call input by means of the call input apparatus 14 and generates a (first) notification that informs the user 2 that they can enter the second waiting zone 8 from the first waiting zone 10. This notification can either take place immediately after the call input or after a period of waiting. If the user 2 has to wait, the control apparatus 16 generates a (second) notification informing the user 2 that they have to wait until they are prompted by a notification to enter the waiting zone 8.

The control apparatus 16 determines an elevator 4 which serves the input elevator call. In one exemplary embodiment, the elevator 4 allocated in this way can be communicated to the user 2 together with the notification that they can enter the second waiting zone 8 from the first waiting zone 10. This can take place, for example, immediately after the call input. The elevator 4 can also be determined at a later time and communicated to the user 2, for example when a notification informs them after a waiting period that they can enter the waiting zone 8 and communicates the allocated elevator to them. The elevator 4 can also be communicated in the waiting zone 10 or in the region of the waiting zone 10, for example by means of the communication device 12 or a cell phone 6. The time of the notification by the control apparatus 16 can occur taking into account the average walking time. The notification can indicate, for example, that (in the case of multiple elevators 4) an identified elevator 4 is ready to enter or will be ready to enter shortly.

The building system 1 described above can be developed depending on the building. In the exemplary embodiment in accordance with FIG. 1, an access gate 22 can be provided at a transition 20 between the waiting zone 8 and the waiting zone 10. The access gate 22 can be part of an access control system which is encompassed by the building system 1. The access gate 22 is connected via a line 42 to the communication network 18 and is communicatively connected to the control apparatus 16 via the communication network 18. In this exemplary embodiment, the control apparatus 16 comprises an access control function (ACS). It is thus possible to check that only authorized users 2 (including those who, according to the waiting zone system described here, are next) can enter the waiting zone 8, for example by blocking or unblocking a door, a barrier, a turnstile, or another physical barrier. In FIG. 1, the access gate 22 is indicated by way of illustration by two turnstiles as an exemplary physical barrier. However, the person skilled in the art will recognize that, in a specific implementation, the access control function or its components may be arranged in different ways. The person skilled in the art also recognizes that the access gate 22 and the associated access control function are optional.

A ticket, which is allocated to the user 2 at the call input apparatus 14 during the call input can, for example, be checked at the access gate 22. The control apparatus 16 stores the ticket together with the associated elevator call. The ticket can be a piece of paper on which a character and/or a number sequence is printed alone or in conjunction with an optical code (barcode, QR code) as ticket information. The ticket can also be announced by means of a loudspeaker system. In one exemplary embodiment, the ticket or the associated ticket information can be transmitted in electronic form to the user 2, for example to their cellular phone 6. Depending on the type of ticket, a device for detecting the ticket and/or control personnel can be provided at the access gate 22. FIG. 1 shows, by way of example, an optical reading device 46 in the form of a camera at the access gate 22, wherein the reading device 46 is also communicatively connected to the control apparatus 16 by means of the line 42.

In one exemplary embodiment, the notification mentioned above and initiated by the control apparatus 16 includes the ticket information. The user 2 to whom this ticket was allocated during the call input can thus recognize that their elevator call is next and the request to enter the waiting zone 8 relates to their elevator call. In one exemplary embodiment, it may be necessary to show the ticket at the access gate 22. Since the control apparatus 16 initiates the notification, it can check whether the ticket information detected at the access gate 22, for example by a detection device, matches that included in the notification. If this is the case, the user 2 is actually next and the access gate 22 unblocks the transition. The user 2 can then go further into the waiting zone 8, receive information about the allocated elevator 4, for example, by means of the communication device 12 there, and start the journey to the desired destination floor.

As already stated above, the technology described here reduces the risk that viruses or bacteria can propagate more as a result of users standing too close together. In one exemplary embodiment, the building system 1 described above can determine a traffic volume in the building, for example by the elevator calls input being recorded in terms of numbers in a specified period. At low traffic volumes, there are few users 2 in the building so that the probability of users 2 standing close together is small; for example, when the volume of traffic is low, a user 2 can be informed immediately after the call input in the waiting zone 10 or in the region of the waiting zone 10 that they can enter the waiting zone 8. If, however, during high traffic volumes there are many users 2 in the building, the probability of users 2 standing too close to one another is higher so that a controlled distribution of the users 2 to the waiting zones 8, 10 can be applied.

With the understanding of the basic system components described above and their functions, an exemplary method for operating the building system is described below in conjunction with the flow chart of FIG. 2. The description is based on the situation shown in FIG. 1. The person skilled in the art will recognize that the method is not limited to the situation shown by way of example in FIG. 1. A person skilled in the art will also recognize that the division into the steps, as shown in FIG. 2, is by way of example, and that one or more of these steps may be divided into one or more sub-steps, or that several of the steps may be combined to form one step; intermediate steps may also be provided.

Figure 2:
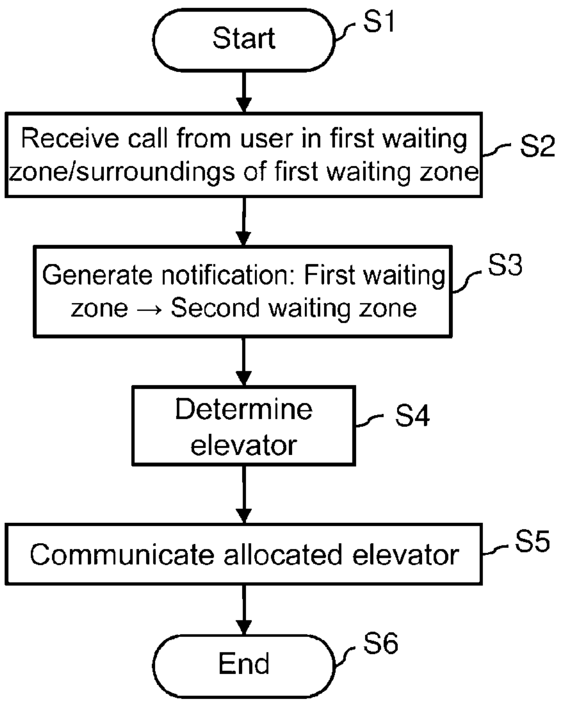
FIG. 2 shows a flow chart of an exemplary embodiment of a method for operating the building system.

FIG. 2 begins the description of the method at step S1 and ends at step S6. Exemplary and possibly optional embodiments of the method are also mentioned in conjunction with the steps.

If a user 2 is in the waiting zone 10 or in a specified environment of the waiting zone 10, the user can input an elevator call by means of the call input apparatus 14. Depending on which control technology is used in the elevator system 1*a*, the user 2 either inputs the desired direction of travel or a desired destination floor. As stated above, the call can be input directly on the call input apparatus 14 (for example by input on a keyboard or by showing an information carrier with an optical or electronic code) or by using a cell phone 6. The cell phone 6 is in radio range to the radio device 24 of the call input apparatus 14. During the radio communication (for example by means of a Bluetooth radio link) between the cell phone 6 and the radio device 24, the radio device 24 detects, for example, an identifier of the cellular phone 6. In a step S2, the elevator call of the user 2 input by means of the call input apparatus 14, which is located in the first waiting zone 10 or in the specified environment of the first waiting zone 10, is received by the control apparatus 16.

In a step S3, a first notification is generated by the control apparatus 16 to inform the user 2. The first notification prompts the user 2 to enter the second waiting zone 8 from the first waiting zone 10. The first notification can request that the user 2, for example, with the aid of a readable text, word, a symbol and/or a voice message, enter the second waiting zone 8. This notification can be transmitted to the user 2 (directly) by the call input apparatus 14 or (indirectly) by means of the cell phone 6 of the user 2.

In a step S4, an elevator 4 is determined (allocated), which serves the received elevator call. In one exemplary embodiment, the determining is carried out by the control apparatus 16. The elevator 4 determined is that elevator 4 which serves the call input by the user 2, i.e., the elevator 4 that the user 2 ultimately enters in the waiting zone 8 in order to travel from there to the desired destination floor. The allocation methods and allocation algorithms for this purpose are known to the person skilled in the art, therefore further explanations do not appear necessary.

In a step S5, a moving of the determined (allocated) elevator 4 is initiated by the control apparatus 16. Depending on the configuration of the elevator system 1*a*, the control apparatus 16 can transmit, for example, a control signal to a control apparatus of the determined elevator 4, which then controls the moving of the elevator car. The method ends at step S6.

The call input can be confirmed to the user 2 at the call input apparatus 14 or by means of the cell phone 6, for example by the first notification or the second notification being communicated to the user. Between the time of the call input and the time of entering the allocated elevator 4, the user 2 is informed by means of the first notification that the user 2 can enter the second waiting zone 8 from the first waiting zone 10. This communication, i.e., the first notification, can take place immediately after the call input or at a later time. If it can only take place at a later point in time, this means, for example, that the user 2 is not allowed to go into the second waiting zone 8 due to a high traffic volume. In this case, the control apparatus 16 generates a second notification that requests the user 2 to wait in the first waiting zone 10 until they are requested to go into the second waiting zone 8. Depending on the configuration of the building system 1, an estimated waiting time can be communicated to the user 2. If the aforementioned ticketing system is used in the building system 1, a ticket can be transmitted to the user 2, for example in conjunction with the second notification.

If multiple cell phones 6 are located in the waiting zone 10, the described radio communication with the radio device 24 of the call input apparatus 14 takes place for each of the cell phones 6, which is in radio range. The person skilled in the art recognizes that the number of users 2 that are present and who carry a cellular phone 6 can thus be determined. In step S2, an elevator call can be received for each of the cell phones 6.

The elevator 4 is allocated in accordance with step S4 immediately after the call input, for example without the user 2 having to wait. In this case, the first notification can comprise information about the allocated elevator 4, analogously for example: "Go to the elevators and take elevator A," or similar information. In one exemplary embodiment, the first notification can only request that the user 2 go to the elevators 4, while the information about the allocated elevator 4 comes later, for example in or on the way to the waiting zone 8. This information can take place, for example, by means of the communication device 12 or the cell phone 6.

In one exemplary embodiment, the user 2, who had to wait after the call input, can be informed in a similar manner via the allocated elevator 4. This means that the second notification, which requests, after a waiting period, that the user 2 enter the second waiting zone 8 comprises the information about the allocated elevator 4. In one exemplary embodiment, the second notification can or it contains only the request, while the information about the allocated elevator 4 takes place in or on the way to the waiting zone 8.

In one embodiment, the time at which the user 2 can go into the waiting zone 8 depends on the traffic volume in the building. If the traffic volume is low, i.e., no or only a small number of elevator calls are currently to be served, it may not be necessary to control the number of users 2 in the waiting zone 8. The first notification can then be issued immediately after the call input. If, on the other hand, the traffic volume is relatively high, the first notification can be issued after a waiting period.

In response to the first notification, the user 2 sets off and possibly requires a certain walking time in order to reach the waiting zone 8 from the waiting zone 10. Taking into account this walking time, the control apparatus 16 in one embodiment causes the communication device 12 to be activated in the waiting zone 8 or in the access entry to the waiting zone 8 in order to notify the user 2 of the allocated elevator. This notification can take place by means of the screen device 34 or the radio device 32. The latter can require that the user 2 with their cell phone 6 is in radio range of the radio device 32. The notification can indicate, for example, that (in the case of multiple elevators 4) an identified elevator 4 is ready to enter or will be ready to enter. After the user 2 has entered the allocated elevator 4, they are transported to the desired destination floor.

In the preceding description, the mobile electronic communication device 6 is, for example, a cell phone. The wireless device 6 may comprise e.g., an application-specific software application (also referred to as an app) that can be activated, when required, by the user 2, for example. The application-specific software application is used in one embodiment in connection with the use of the elevators 4. In one embodiment, the application-specific software controls the generation and transmission of the elevator call. Depending on the configuration, this software can also generate the identifier of the cell phone 6, for example an identifier that is unique to the cell phone 6 and cannot be changed over time. Such an identifier generated by software is an alternative to a device identification number and a telephone number, which can also be used as an identifier.

Alternatively, the mobile electronic communication device 6 may be, for example, a cell phone, a smartphone, a tablet PC or a smartwatch, wherein these devices are usually equipped with hardware and software that enable communication via a near-field radio network. However, the mobile electronic communication device 6 may also be eyeglasses with a miniature computer or another body-worn, computer-aided device (also referred to as a "wearable device"), in particular a smartwatch. Depending on the configuration of the mobile electronic communication device 6, it may comprise, for example, a graphical user interface (GUI) for operation.

If such a mobile communication device 6 is used, it communicates with the radio device 24 of the call input apparatus 14 or the radio device 32 of the communication device 12 when it is in its radio range, i.e., for example, the radio signal has, at the location of the transceiver 24, 32 and at the location of the mobile communication device 6, a signal strength (expressed by an RSSI value (received signal strength indicator)) that is greater than a threshold specified for secure reception. The communication takes place, for example, via a near-field radio network such as, for example, a Bluetooth radio network, WLAN/WiFi or a ZigBee radio network. Bluetooth is a standard in accordance with IEEE 802.15.1, WLAN/WiFi is a standard in accordance with IEEE 802.11, and Zig-Bee is a standard in accordance with IEEE 802.15.4. Such radio networks in accordance with these standards are used for the wireless networking of devices over a short distance of approximately a few meters to approximately one hundred meters. The radio network forms the interface via which the mobile combination device 6 and the radio devices 24, 32 may communicate with one another.

In summary, one aspect of the technology described here relates to a building system 1 which better protects its users 2 against the risk of infection by bacteria or viruses. This is achieved by a multi-stage waiting zone system that guides the users 2 to the elevator system 1*a* individually and in a controlled manner. As stated above, the building system 1 can be adapted to various requirements. For example, it can be equipped with a ticket system which increases ease of use because it prevents any errors on the part of users. At the same time, however, the building system 1 is so flexible that it adjusts waiting times to a current traffic volume, so that, for example, a user 2 may be requested immediately after the call input to directly enter the waiting zone 8 in order to be able to start their journey without delay.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A building system for a building in which an elevator system is installed and encompassed by the building system, wherein a first waiting zone and a second waiting zone accessible from the first waiting zone for users of the elevator system are specified for the building, and wherein the second waiting zone is located in an access region to an elevator of the elevator system, the building system comprising:

a call input apparatus configured to receive elevator calls from users located in the first waiting zone or located in a specified environment of the first waiting zone;

a control apparatus communicatively connected to the call input apparatus; and wherein the control apparatus is configured, for each of the users, to register the elevator call from the user received by the call input apparatus, to generate a first notification to inform the user, wherein the first notification prompts the user to enter the second waiting zone from the first waiting zone, and to determine an elevator to serve the registered elevator call and to cause the determined elevator to move.

2. The building system according to claim 1 wherein the first notification generated by the control apparatus includes information about the determined elevator.

3. The building system according to claim 1 wherein the control apparatus is configured to generate a second notification that requests the user to wait in the first waiting zone or in the specified environment of the first waiting zone, and wherein the control apparatus generates the second notification before generating the first notification.

4. The building system according to claim 1 wherein the call input apparatus includes at least one of a radio device for receiving the elevator call input by a mobile communication device of the user, a reading device for reading an electronic or optical code and an input device for manually inputting the elevator call.

5. The building system according to claim 4 wherein the radio device is configured to transmit the first notification to the mobile communication device of the user, or wherein the call input apparatus is configured to communicate the first notification by a display and/or a voice message.

6. The building system according to claim 1 including a communication device arranged in the second waiting zone or in an access entry to the second waiting zone and being communicatively connected to the control apparatus, wherein the control apparatus is configured to control the communication device to communicate the determined elevator to the user.

7. The building system according to claim 1 including an access gate communicatively connected to the control apparatus, the access gate being provided at a transition between the first waiting zone and the second waiting zone, wherein the access gate is configured to unblock or block the transition, and wherein the access gate is part of an access control system of the building system.

8. The building system according to claim 7 wherein the control apparatus is configured to allocate a ticket to the input elevator call and to cause the ticket to be transmitted to the user, and wherein the control apparatus controls the call input apparatus for the ticket transmission.

9. The building system according to claim 8 wherein the access gate includes a reading device for detecting the ticket allocated by the control apparatus, and wherein the control apparatus is configured to control the access gate such that the transition is unblocked when the detected ticket corresponds to the ticket allocated to the elevator call.

10. The building system according to claim 8 wherein the call input apparatus is configured to print the ticket, display the ticket, announce the ticket, or transmit the ticket as a radio signal to be received by a cell phone of the user.

11. A method for operating a building system of a building, wherein a first waiting zone and a second waiting zone that is accessible from the first waiting zone for passengers of an elevator system installed in the building and encompassed by the building system are specified, wherein the second waiting zone is located in an access region to an elevator of the elevator system, the method comprising the steps of:

receiving, by a control apparatus, elevator calls from users located in the first waiting zone or located in a specified fixed environment of the first waiting zone, the elevator calls being input by a call input apparatus located in the first waiting zone or in the specified environment of the first waiting zone, and the control apparatus being communicatively connected to the call input apparatus;

for each of the elevator calls, generating, by the control apparatus, a first notification to inform the user, wherein the first notification prompts the user to enter the second waiting zone from the first waiting zone;

determining, by the control apparatus, an elevator of the elevator system to serve the received elevator call; and causing, by the control apparatus, the determined elevator to move.

12. The method according to claim 11 wherein the first notification generated by the control apparatus includes information about the determined elevator.

13. The method according to claim 11 including generating a second notification by the control apparatus, wherein the second notification prompts the user to wait in the first waiting zone or in the specified environment of the first waiting zone, and wherein the control apparatus generates the second notification before generating the first notification.

14. The method according to claim 11 including transmitting the first notification to the call input apparatus that displays the first notification, or to a mobile communication device of the user, which mobile communication device displays the first notification.

15. The method according to claim 11 including generating a ticket allocated to the input elevator call and transmitting the ticket to the user, and wherein the control apparatus controls the call input apparatus for transmission of the ticket.

* * * * *